E. L. GREENSFELDER.
METHOD AND APPARATUS FOR SYNCHRONOUSLY PRODUCING SOUNDS TO ACCOMPANY MOTION PICTURES
APPLICATION FILED MAR. 30, 1916.
1,254,684.
Patented Jan. 29, 1918.
4 SHEETS—SHEET 1.
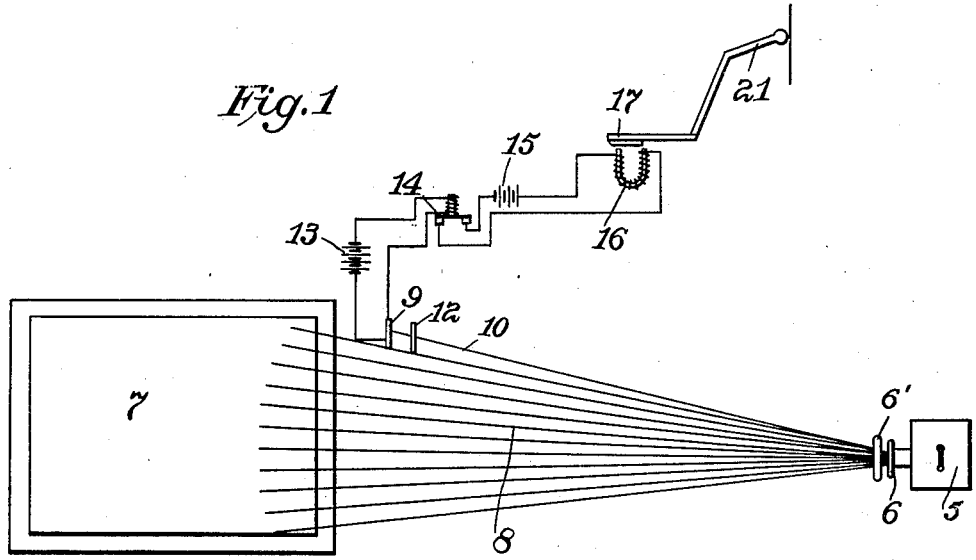
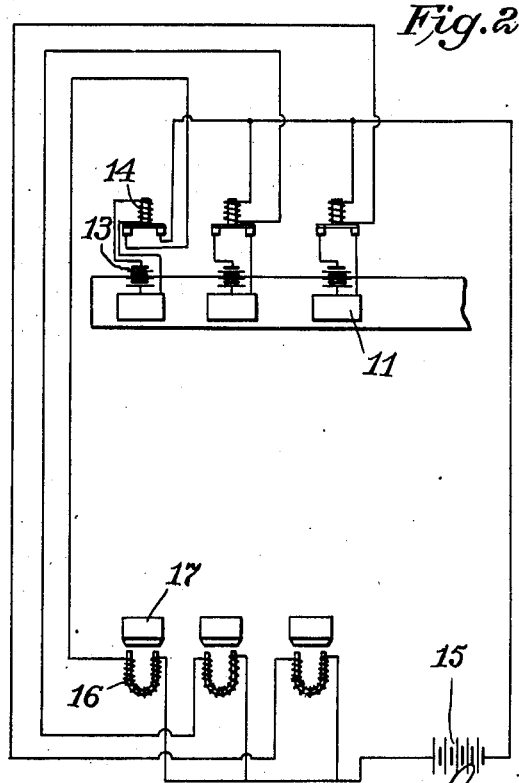
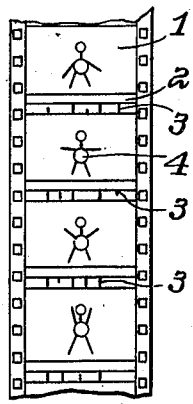
Inventor:
Elmer L. Greensfelder,
by Shear Middleton, Donaldson Shear
Attys.

E. L. GREENSFELDER.
METHOD AND APPARATUS FOR SYNCHRONOUSLY PRODUCING SOUNDS TO ACCOMPANY MOTION PICTURES
APPLICATION FILED MAR. 30, 1916.
1,254,684.
Patented Jan. 29, 1918.
4 SHEETS—SHEET 2.
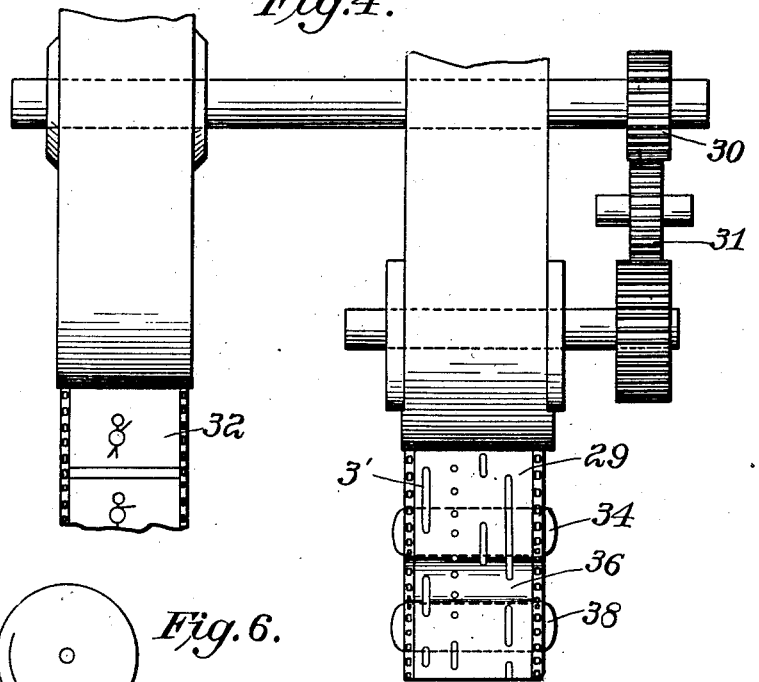
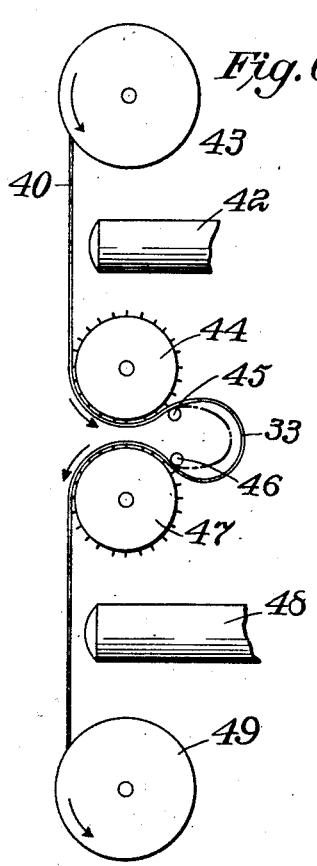
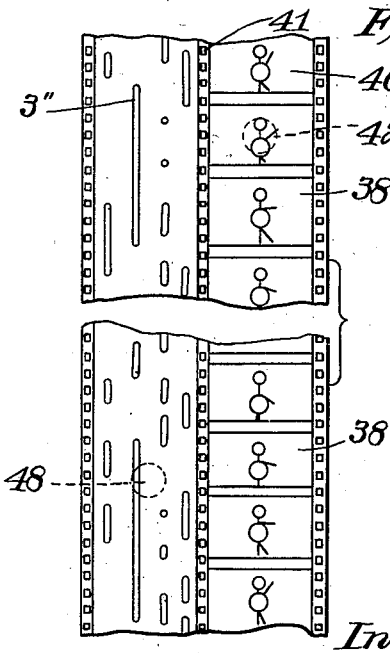
Inventor:
Elmer L. Greensfelder
by Spear, Middleton, Donaldson & Spear
Attys.

E. L. GREENSFELDER.
METHOD AND APPARATUS FOR SYNCHRONOUSLY PRODUCING SOUNDS TO ACCOMPANY MOTION PICTURES
APPLICATION FILED MAR. 30, 1916.

1,254,684.

Patented Jan. 29, 1918.
4 SHEETS—SHEET 3.

Inventor:
Elmer L. Greensfelder,
by Spear, Middleton, Donaldson & Spear
Attys.

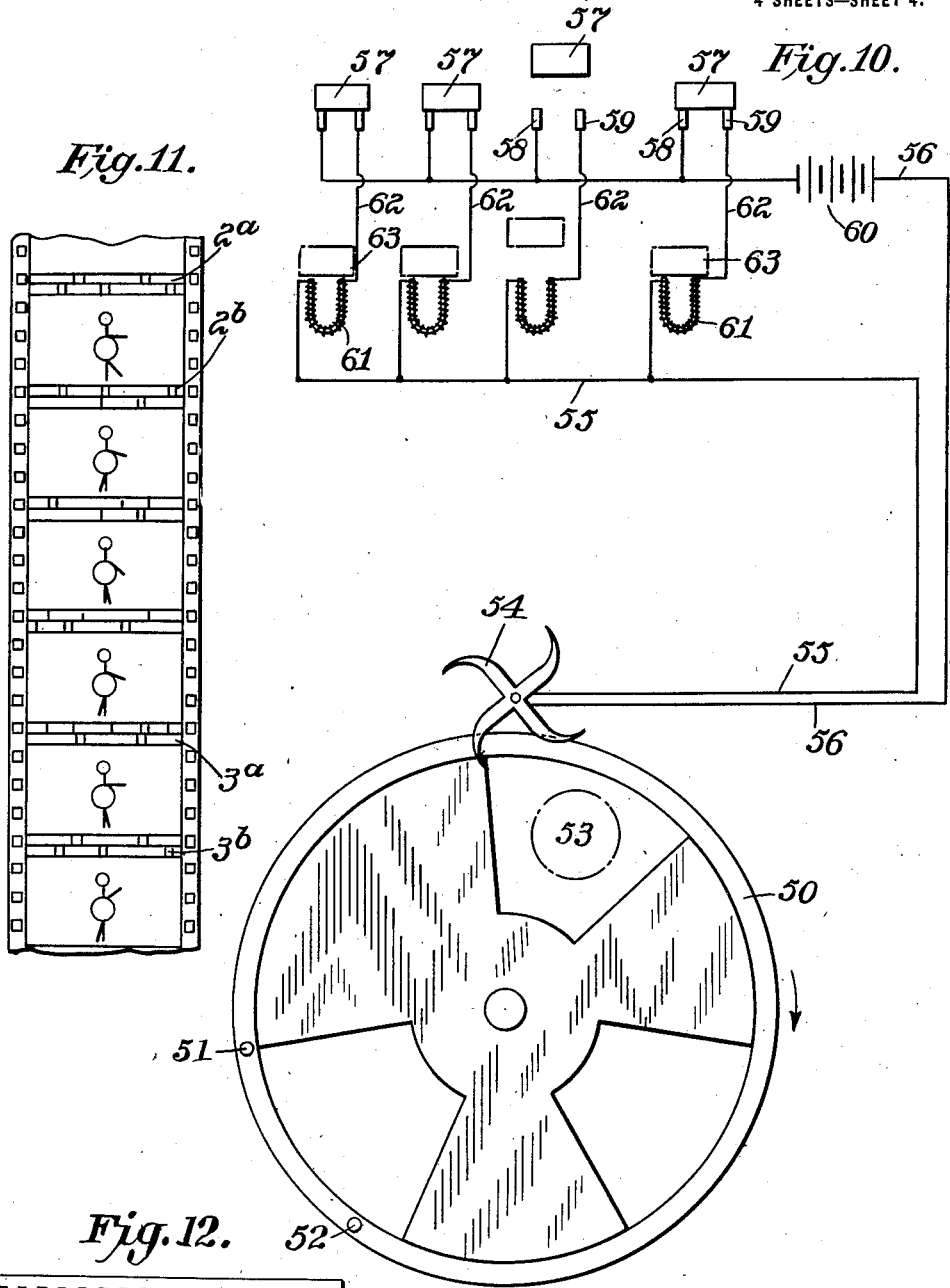

UNITED STATES PATENT OFFICE.

ELMER LEWIS GREENSFELDER, OF BALTIMORE, MARYLAND.

METHOD AND APPARATUS FOR SYNCHRONOUSLY PRODUCING SOUNDS TO ACCOMPANY MOTION-PICTURES.

1,254,684.          Specification of Letters Patent.     Patented Jan. 29, 1918.

Application filed March 30, 1916. Serial No. 87,788.

*To all whom it may concern:*

Be it known that I, ELMER L. GREENSFELDER, a citizen of the United States, and residing at Baltimore, Maryland, have invented certain new and useful Improvements in Methods and Apparatus for Synchronously Producing Sounds to Accompany Motion-Pictures, of which the following is a specification.

The present invention relates to an improved method of producing different sounds during the projection of motion pictures upon the object screen. As is customary at present, while the pictures are being shown upon the screen, the orchestra plays appropriate musical selections. In order to produce a more realistic effect the music is generally chosen and conducted so as to give added expression to the actions and descriptive scenes being reproduced in pantomime on the screen. Unusual sounds, such as the report of a gun, the shriek of a whistle, the clatter of horses' feet, the cry of a child, the ringing of a bell, etc., all of which add greatly to the vividness of the scene, are generally assigned to one of the men in the orchestra to be reproduced as nearly in synchronism with the corresponding action in the picture as possible.

The object of the present invention is to provide an improved method whereby these various supplemental sounds, or even the piano accompaniment will be produced by the various instruments in exact synchronism with the reproduction on the picture screen of the scene of which they are illustrative.

The invention consists in providing a system of control for these several instruments which will be automatically operated by the picture film itself. It consists, more specifically, in photographing on the film a series of lines, or marks, disposed parallel to the length of the film, and suitably positioned in relation to the individual pictures of the scene being reproduced, to accompany the action or description which it is desired to have emphasized by the corresponding sound. These lines or marks are made transparent, white, or translucent on a darkened background. The lines may each represent one note of a piano (in the case of a piano record), while others may represent an expression lever, a sustaining pedal, or the operating mechanisms, or instrumentalities for beating a drum, ringing a bell, blowing a whistle, or producing like noises. The light from the motion picture machine passes through these transparent "sound marks" as the film is being shown on the screen. These light rays are intercepted between the lens of the machine and the screen, or at the screen, and caused to fall upon a series of exposed, separate, selenium cells. An individual selenium cell is provided for each "sound mark" of the film and each ray of light is directed by a system of slots and guides to exactly register with its corresponding cell. These cells are in turn each connected with a separate relay, electric battery and electro-magnet, the latter being so placed as to mechanically operate the sound instrumentality upon its becoming energized.

The invention further contemplates the provision of a method by which the musical instruments may be controlled and instrumental selections rendered separately and independently of the pictures, as for example, during the intermission of performances, or at any desired time or place.

The invention includes among other objects suitable arrangements and connections, whereby the sound producing instruments may be located near the screen or at a point sufficiently remote from the motion picture machine to produce the desired effects upon the audience.

The invention, while embodying in all of its forms the main principles of operation above set forth, may be varied somewhat to adapt itself to different kinds of machines. For example as previously pointed out, the "sound marks" may be placed on the picture film and be operated by the intermittent feed of the machine. Besides this method the "sound marks" might be formed on a separate reel of film adapted to have a continuous motion and geared to the sprocket turning the picture reel. Again a continuous method of projecting the "sound marks" may be employed in which a widened reel is used, on one side of which are the "sound marks", while the pictures occupy the remaining space.

With these and other objects in view the invention consists in the combination and arrangement of parts more fully described in the following specification, illustrated in the accompanying drawings and pointed out in the appended claims.

In the drawings the various methods by which the invention may be put into practice are illustrated diagrammatically by a series of views suggesting the arrangement and use of the several forms of apparatus employed.

In the drawings:—

Figure 1 is a diagrammatic view illustrating one embodiment of the present invention.

Fig. 2 is a diagram showing the electrical connections for the same more in detail.

Fig. 3 is a portion of a film of usual type having one arrangement of "sound marks" photographed thereon.

Fig. 4 illustrates diagrammatically a modified arrangement involving the use of two separate films driven synchronously.

Fig. 5 is a diagrammatic plan view illustrating a further modified arrangement involving the use of a double width film.

Fig. 6 illustrates the arrangement of Fig. 5, shown in side elevation.

Fig. 10 illustrates diagrammatically an arrangement for sustaining the connecting of the electric circuits until the next consecutive row of "sound marks" is before the projecting lens.

Fig. 11 is a modified form of film.

Fig. 12 illustrates the screen 12.

Figure 7:
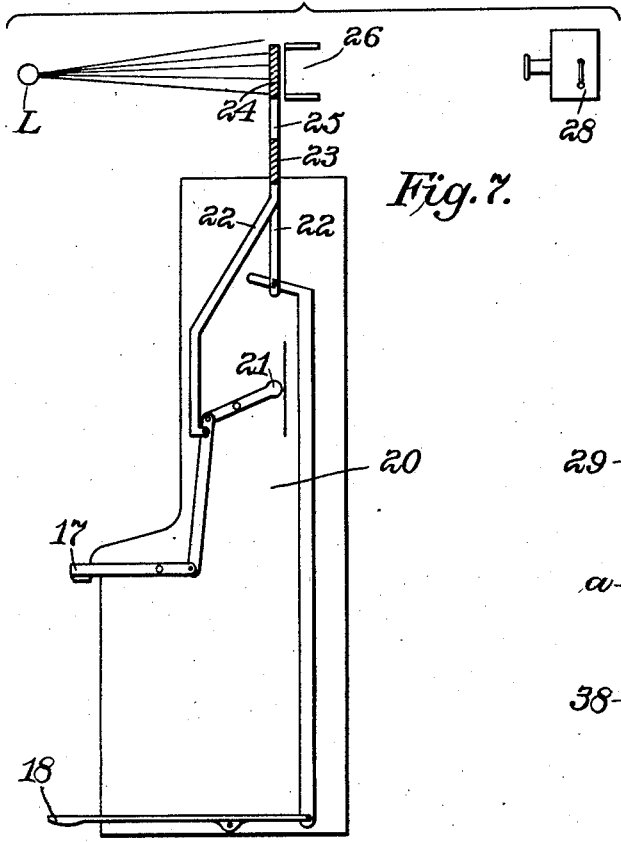
Figs. 7 and 8 illustrate diagrammatically in side and front elevational views respectively the apparatus used in recording the "sound marks" on a film.

The invention will first be described in connection with the method illustrated by the diagrammatic views, Figs. 1, 2 and 3, in which a series of "sound marks" are recorded on a small section of the ordinary picture film. Fig. 3 shows a fragmental strip 1 of an ordinary motion picture film, having the usual transverse sections 2 on which there is no photograph or marking. In addition this view shows horizontal rows of "sound marks" 3, located immediately above the picture 4 and below the section or blank strip 2. It is obvious that the "sound marks" 3 could be located equally well below the picture rather than above. These "sound marks" consist of a series of translucent, transparent or white spaces, photographed on a darkened surface in the form of parallel lines extending in a direction parallel to the length of the film. The purpose of these "sound marks" is to permit rays of light from the lens of the projecting machine to pass through when the picture film is being projected upon a screen. The manner in which these lines or "sound marks" are photographed on the film will be described in detail in another part of this specification. Fig. 1 illustrates diagrammatically the relative position and arrangement of all the instrumentalities employed in the use of an ordinary film carrying the "sound marks" 3 thereon at intervals between the pictures. The projecting motion picture machine 5, with its lens 6 and shutter 6' is suitably located so as to project the pictures on the object screen 7, 8 representing the cone of light rays passing from the lens to the screen. A shelf 9 is placed at a suitable point between the lens 6 and screen 7, or at the screen 7, so as to intercept the rays of light 10 coming from the film through the "sound marks" 3. The shelf 9 contains a plurality of selenium cells or plates 11 arranged in a horizontal row corresponding in number and arrangement to the "sound marks" 3 on the film. A slotted screen or grating 12 may be properly positioned in front of the shelf 9 for the purpose of reducing the magnified light rays coming from the "sound marks" and preventing overlapping of the rays on the selenium surfaces. Each particular "sound mark" 3 on the film has a corresponding selenium cell 11 on the shelf 9, upon which it is adapted to impinge a ray of light as it passes between the light source and the lens of the projecting machine. When, for example, it is desired to apply the invention for the purpose of operating a player piano, eighty-eight "sound marks" 3 are provided, one for each note of the piano and additional "sound marks" for expression levers. The number and arrangement of these "sound marks" can be varied at will according to the number and variety of sound instruments it is desired to operate.

As previously pointed out, the rays of light 10 being dispersed and directed through the "sound marks" 3 and then reduced by the slits of the grating 12, are directed upon the corresponding selenium cells 11. These latter are each connected with a battery 13 in series with a corresponding relay 14, which in turn are connected through a second battery 15, each to a corresponding electro-magnet 16 adapted to operate a control lever 17 of a piano key, expression pedal, drum stick or other sound producing instrument. It is well known that selenium, when exposed to a concentrated ray of light, changes its conductivity with a resultant lowering of its electrical resistivity. This electro-physical change is relied on for the purpose of closing the electric circuit, including battery 15 and the energization of the corresponding electro-magnet.

The exact system of electrical connections may be varied by providing, for instance, a single battery instead of the individual ones 13 to operate any of the selenium cells 11 on which the light might fall, or again battery 15 could be replaced by a number of small batteries, one for each relay. Again either battery 15 or batteries 13 could be replaced by a source of current, such as the house current, connected through a transformer.

The position of the shelf 9, containing the selenium cells 11, can be placed at any arbitrary point in the path of the light rays coming through the "sound marks" 3, either at or near the screen 7, or at a point about midway between the screen and the lens (as shown in Fig. 1), or near the operator's room. In order to effect the different locations of the shelf 9, a mirror may be placed in the path of the projected light rays so as to reflect them at any desired angle. A special lens may be placed near the projecting camera, through which the light rays are passed and dispersed so as to allow the shelf 9 to be placed within a comparatively short distance of the projecting lens of the motion picture machine.

Instead of using a separate selenium cell for each "sound mark" as proposed, a single structure may be used with an exposed selenium surface which is divided lengthwise electrically into as many sections as there are sounds and expressions to be operated by tapping off at regular intervals and connecting separately with the sources of current, relays, electro-magnets and corresponding sound instruments and expression levers to be operated. A shelf of thin partitions placed before the subdivided selenium surface would prevent the interference of the light ray coming from a "sound mark" with any selenium surface subdivision except its corresponding one.

Figure 8:
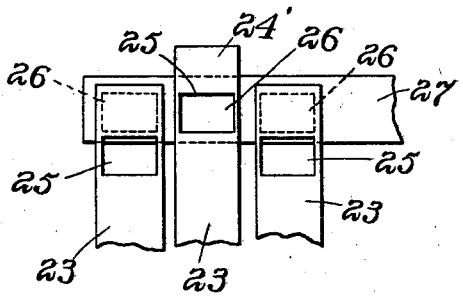

The method of photographing the "sound marks" 3, as used in the method illustrated in Figs. 1 to 3, will next be described in detail and reference is made to Figs. 7 and 8 of the drawing. The rows of "sound marks" are photographed onto the picture film by a motion picture camera, the film of which is moved intermittently as is done in photographing an ordinary motion picture scene. It is absolutely necessary that the film be moved, while the "sound marks" are being photographed, at exactly the same speed at which the picture film, of which they are to control the accompanying sounds and music, is moved. By way of illustration, Figs. 7 and 8 show the manner of photographing the "sound marks" to record the notes of music played upon a piano. Each key 17 or expression pedal 18 of a piano 20, or other instrument, the sound of which is to be recorded, operates a hammer 21, or corresponding part of another instrument, and at the same time moves a rod 22, which in this case is moved vertically. At the upper end of the rod 22 a plate 23 is carried, provided with blind or shuter part 24 and a corresponding opening 25 located immediately below the same. The plate 23 is adapted to normally remain in its lowered position with the shutter 24 intercepting the rays of light from any suitable source L and preventing them from registering with an aperture 26 formed in a horizontal shelf 27. A motion picture camera 28 is suitably positioned behind the shelf 27 in line with the series of apertures 26. As the key or pedal of the piano operates the hammer 21, the rod 22 and plate 23 are moved so as to bring the opening 25 opposite the aperture 26 and allow the light from the source L to pass therethrough and be photographed by the motion picture camera 28. The film of the camera 28 must be moved at the same speed for the purpose of photographing the "sound marks" 3, as when the camera is used for the purpose of photographing the corresponding scene to be reproduced. While the "sound marks" 3 are being made by photographing the light intermittently passing through the aperture 26, the picture part of the film in camera 28 is screened by a blind or shutter so as to remain unexposed. In this manner the "sound marks" 3 are photographed only on the narrow row strip of the film shown in Fig. 3.

In order to secure the best results it has been found advisable to have a motion picture positive properly pieced and joined so as to be ready for projecting and exhibiting before recording on the film in camera 28 the rows of "sound marks" that are to accompany the animated picture. This positive should contain on it blank spaces in the position of 3, Fig. 1. On the completed positive ready for the market these blank spaces will be filled in by rows of sound marks, and the spaces for the pictures by the pictures, which can be effected by such a method as printing the positive from the two superimposed negatives, as will be hereinafter described. The pianist or musician, who is to play the accompaniment to be recorded for the picture, watches the positive picture as it is projected on the screen before him from a motion picture apparatus at a definite speed. After he has become familiar with the picture, the positive is again projected through the motion picture apparatus and he then plays the accompaniment to the picture, introducing whatever melodies, chords, compositions or sound effects he thinks appropriate to the action of the objects or characters in the picture. The instrument which he operates is connected and controlled by the mechanisms just described in connection with Figs. 7 and 8, and the "sound marks", corresponding to the sounds and expressions produced, are recorded on the film of camera 28, it being understood that this camera is operated at precisely the same speed at which the picture projecting machine was operated. A developed negative containing the rows of "sound marks", but on which the spaces for the pictures are blank, is superimposed upon a developed negative properly pieced and joined and having the pictures photographed thereon but having spaces for the "sound marks" left blank, and a print is made from this combined negative which will give a positive containing the pictures 4 and the corresponding rows of "sound marks" 3, shown in Fig. 3.

Another method by which these rows of "sound marks" 3 may be recorded so as to appear as shown in Fig. 3, is by making a marked or perforated roll of the music and sounds, such as is used in player pianos and automatic musical instruments. This roll is then moved in the direction of its length at the proper speed and is photographed through a slit by a motion picture camera, on the film of which the spaces for the pictures are not exposed to the light. The finished positive containing the pictures and "sound marks" in their proper positions may then be made by superimposing two negatives, as above described.

The method of photographing the "sound marks" 3 by the use of the motion picture camera necessarily involves a series of intermittent exposures, due to the operation of the motion picture camera shutter. It will be seen that some of the notes so photographed or marked will be of such length as to be recorded by "sound marks" extending over several consecutive pictures, while others may be of such brief duration as to be represented by "sound marks" contained on only one or two consecutive pictures. It is necessary to have the individual electric circuits so adjusted as to be sufficiently sluggish and therefore not disconnect the current when a certain "sound mark" is continued over two or more consecutive pictures, otherwise the note or sound which was intended to be sustained would not be reproduced continuously. On the other hand, the circuits must be so adjusted as to disconnect whenever their corresponding "sound mark" does not accompany a picture.

One method by which the circuits operating the electro-magnets can be made to hold over without disconnecting the current until the next consecutive row of "sound marks" is in position before the lens, is illustrated by the use of the apparatus shown in Fig. 10. The shutter 50 is equipped with two lugs 51 and 52 located as shown in Fig. 10, so that when the shutter 50 revolves before the projecting lens 53 they operate a switch 54 which makes and breaks the current flowing through wires 55 and 56. Lug 51 closes the circuit so that the electro-magnets energized by the "sound marks" 3 on the picture before the projecting lens remain energized until the film has passed behind the shutter and the next consecutive picture and row of "sound marks" is before the projecting lens; then lug 52 disconnects the current, at which moment light from the next row of "sound marks" is projected to the selenium cells. Each note, expression lever or sound hammer 57 when operated or sounded makes contact with separate contact points 58 and 59. Contact points 58 are connected by a battery 60 or other source of current to the switch 54 at the shutter and the other wire 55 running from the switch 54 connects with a pole of each electro-magnet 61. The other pole of each electro-magnet is connected by a separate wire 62 to its respective contact point 59. 63 shows the positions of the keys when a piano is used. By this method whenever a sound or expression instrumentality is operated or sounded, each of the particular sounds or expressions is sustained until the next consecutive row of "sound marks" is in position before the projecting lens. The sustaining of the sounds and expressions is effected while the light falling on their corresponding selenium cells is screened off by the opaque sections of the shutter.

A further method of keeping the electro-magnet circuits from disconnecting until the next consecutive picture is in proper position before the lens, is to have the film made with the "sound marks" recorded thereon as shown in Fig. 11. This form of film is practically the same as that shown in Fig. 3, except that in the present form there are additional rows of "sound marks" $2^a$, $2^b$, etc., in the spaces which, in ordinary films, exist between the pictures. The "sound marks" $2^a$ are the same as those indicated at $3^a$ and the "sound marks" at $2^b$ are the same as those indicated at $3^b$, etc. These identical rows of "sound marks" are always separated by the same number of pictures. In allowing the rays of light to pass through the "sound marks" a secondary projecting lens is used which is also focused on the selenium cells. This secondary lens is used only for the "sound marks" $2^a$, $2^b$, etc., and the main projecting lens is used to allow the rays of light to pass through the "sound marks" $3^a$, $3^b$, etc. As the rays of light from main lens passes through the "sound marks" $3^a$, "sound marks" $2^a$ appear in position before the secondary lens. As soon as the shutter is about to screen off marks $3^a$ then the rays of light from the secondary lens passes through $2^a$ and thus the identical marks are projected and superimposed on the selenium cells. This row of marks $2^a$ remains before the secondary lens until $3^b$ have replaced $3^a$ before the main projecting lens, then a shutter screens off $2^a$ and in a similar manner $2^b$ next appear before the secondary projecting lens. In this manner, although the film is moving intermittently before the main lens, yet the selenium cells are properly kept in the path of the light until the next row of "sound marks" is in position before the main lens.

By the methods just described the action in the motion picture will be synchronous with the accompanying sounds. Should the film break, as happens in operating motion picture machines now in use and should the operator piece together the broken film, the sound and action on the mended film will still remain synchronous, even though one or more pictures of the film be left off as the corresponding "sound marks" for the accompanying sound will have been removed with the pictures.

Figure 9:
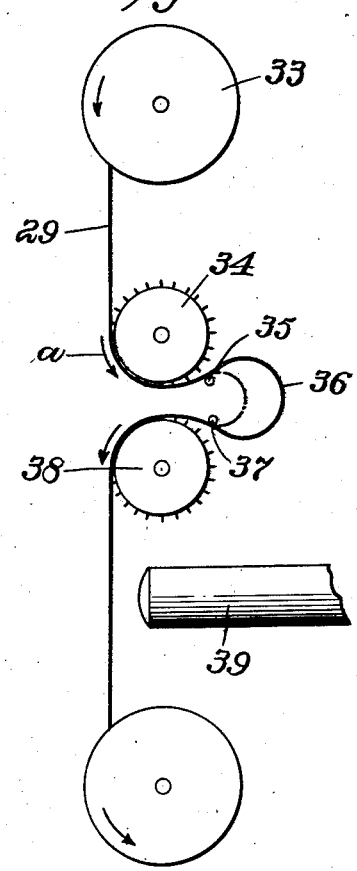
Fig. 9 illustrates diagrammatically take-up mechanism used to move the film at a constant speed before the projecting apparatus.

The method in which the "sound marks" are photographed on a separate film adapted to be continuously driven and geared to the sprocket turning the picture film will next be described. As shown in Fig. 4, a separate film 29 is used for the "sound marks" and instead of having them formed in rows between the pictures, as described in connection with Figs. 1 to 3, the marks for each note, expression element or sound instrument are continuous. The "sound marks" 3' consist of transparent marks parallel to the direction of the length of the film and vary in length in direct proportion to the length or duration of the sound which they represent. Here the "sound marks" 3' are similar in appearance to the slits or perforations of the ordinary music roll used in player pianos and automatic musical instruments of that type. This sound film 29 can be photographed from an operating piano or mechanism, such as illustrated in Fig. 7 and described in connection therewith, except that the reel in the photographing camera 28 must move before the lens at a constant continuous speed and not intermittently and with no shutter interference. This can be done by removing the shutter and intermittent sprocket mechanism of the ordinary motion picture machine. As described in connection with the method illustrated in Figs. 1 to 3 and 7 and 8, this film may be made by first making a perforated roll of the sound accompaniment, such as is used for player pianos and then while this roll is moving in the direction of its length and at the proper speed, photographing it through a slit by a motion picture camera from which the shutter and intermittent sprocket mechanism have been removed. The mechanism holding the film 29, having the "sound marks" photographed thereon, is geared to the sprocket 30, by suitable mechanism 31, of the picture film 32, or it is geared to a mechanism adapted to turn the sound film at the same speed at which it was moving when photographed and thus produce the sounds synchronously with the accompanying pictures. It will be understood that separate lenses are used for the purpose of projecting the pictures of the film 32 and the "sound marks" 3' of the film 29. The film 32 will operate in the intermittent manner before the projecting lens used in exhibiting motion pictures and will be thus projected to the screen. The accompanying sound film, however, must move at a constant continuous speed before the lens, which is to project the rays of light through the "sound marks" 3' on to their respective selenium cells. This can be effected by a take-up mechanism shown in section in Fig. 9. Here the film of "sound marks" 29 unwinds from the spool 33 at an intermittent speed proportionate to the intermittent speed of the picture film 32 to which it is geared. It then passes over sprocket 34 behind a guide bar 35 to form a loop 36 back of a second guide bar 37 and over a second sprocket 38 and then moves at a constant continuous speed in front of a projecting lens 39, which projects and disperses the rays penetrating the "sound marks" 3' to their corresponding selenium cells located in the path of these rays and connected to their corresponding source of current, relay, electromagnets, and sound producing instruments, as hereinbefore described. If the sprocket 38 is turning at a constant continuous speed it will allow the sound film to pass at such speed before its projecting lens 39, while the loop 36 of the film will decrease and increase in size and supply sufficient lengths of the film, to permit of this constant continuous speed over sprocket 38 and yet allow the film to pass intermittently over sprocket 34 in the direction of the arrow $a$.

Should the sound or picture film described in this method break, to maintain synchronism in the operating of the two films, it would be necessary in repairing the broken film to add a proportionate amount of blank film and thereby keep both films of the original proportionate length.

Referring to Figs. 5 and 6, the invention is shown as applied to a film of double width, one-half of which contains the pictures 38 while the other half contains the "sound marks" $3^2$ formed similarly to those illustrated and described in connection with Fig. 4. The film 40 in this instance, is provided with an additional row of perforations 41 to fit cogs on the mechanism in order to prevent buckling of the film in operating it through the projecting machine. The film could be made in a manner similar to that described in connection with the method illustrated by Fig. 4 but it will be necessary in projecting this film to have the "sound marks" moved at a constant continuous speed before its projecting lens, while the pictures must be moved before the lens which projects them in the intermittent manner usually employed in projecting motion pictures. A convenient way to obtain the film 40 is to first photograph a negative of the original sound film and place it side by side with a finished and pieced negative of the corresponding picture film, then from the two print a one piece double width positive, such as shown in Fig. 5. The "sound marks" do not necessarily have to be immediately opposite or adjacent to the particular picture or pictures which they are to accompany in order to have synchronism between the two in projecting. The "sound marks" 3² do not pass in front of the lens 42 but to one side of it and consequently are not projected by it. The lens 42 is used to project the pictures as the film 40 comes from the reel 43. After passing the lens 42 the film passes over a take-up mechanism similar to that shown and described in connection with Fig. 9, except that in the present case the sprocket 44, bars 45 and 46, and sprocket 47 are broad enough to accommodate the widened film containing both the pictures and the "sound marks" adjacent to one another. From the take-up mechanism the film passes before the lens 48 and is wound upon reel 49. Lens 48 is used for projecting the rays of light through the "sound marks" and is offset to one side of lens 42. On passing over the sprocket 47 the film is moved at a constant continuous speed instead of intermittently as when passing before lens 42. It will thus be seen that from this arrangement the pictures 38' are intermittently fed so as to be projected by the lens 42 while the "sound marks" 3² are passing simultaneously to one side of the lens and therefore not receiving light therefrom. Then later as the film moves with a continuous constant motion before lens 48, the rays of light pass through the "sound marks" 3² while the pictures are moving to one side of the lens and receive no light therefrom.

Should the operator have reason to mend a broken film, such as is used in this method, the synchronism of sound and action will not be destroyed in operating the mended film, for every section of the picture film removed a corresponding length of the sound film could be removed.

While I have shown the present invention as applied for the purpose of reproducing sounds, such as the playing of a piano, etc., it is to be understood that the invention is not limited to the particular examples illustrated and described in the present case, as various other instruments and sound producing mechanisms can be equally well operated by the use of this method, the electro-magnets either depressing the notes and expression pedals as described or controlling stops in front of tracker-board apertures in electrically operated instruments.

Having described my invention what I claim is:—

1. The hereindescribed method of producing musical sounds and the like synchronously with the actions in a motion picture film that is being projected, consisting in photographing upon a film sound marks in given relation to the pictures, simultaneously projecting the pictures and rays of light through the sound marks, whereby the pictures will be thrown on a screen and the light from the sound marks will be directed upon selenium cells to close electric circuits and operate suitable sound producing instruments.

2. The herein described method of producing musical sounds and the like synchronously with the actions in a motion picture that is being projected, consisting in photographing pictures on certain portions of a picture film, recording rows of sound marks on other parts of the film, and simultaneously projecting the pictures upon a screen and rays of light through the sound marks upon the light operated means controlling certain sound producing instruments.

3. Apparatus for synchronously producing musical sounds and the like to accompany the projection of motion pictures comprising, a film having picture scenes and sound marks photographed thereon, means for simultaneously projecting the pictures and rays of light through the sound marks, sound producing instruments, and light controlled means upon which the sound marks are projected for operating said sound producing instruments.

4. Apparatus for synchronously producing musical sounds and the like to accompany the projection of motion pictures comprising a film having sound marks and pictures contained thereon in a given relation, sound producing instruments, light operated means adapted to operate said instruments, and means for simultaneously projecting said pictures and rays of light through said sound marks onto said light operated means.

5. Apparatus for synchronously producing musical sounds and the like to accompany the projection of motion pictures comprising a picture film having sound marks thereon, sound producing instruments, electro-magnetic operating means therefor, electric circuits including said electro-magnetic means, light-operated means for closing and opening said circuits, and means for simultaneously projecting the pictures and light through the sound marks on to said light-operated means.

6. Apparatus for synchronously producing musical sounds and the like to accompany the projection of motion pictures comprising a picture film having sound marks thereon, sound producing instruments, electro-magnetic means for actuating said instruments, a plurality of selenium cells, electric circuits including said selenium cells and electro-magnets, and means for simultaneously projecting the pictures and rays of light passing through said sound marks on to said selenium cells for opening and closing said circuits.

7. A motion picture machine comprising in combination, a plurality of independently operable sound producing elements, and light operated means automatically controlled by the film for independently operating said elements synchronously with the actions of the pictures.

8. Apparatus for synchronously producing musical sounds and the like to accompany the projection of motion pictures comprising a picture-film having horizontal rows of transparent sound marks on sections thereof immediately preceding each picture, sound producing instruments, electro-magnetic means for actuating said instruments, a plurality of selenium cells, electric circuits including said selenium cells and electro-magnets, light operated means for opening and closing said circuits, said light operated means being adapted to be controlled by the rays of light through the sound marks.

9. Apparatus for synchronously producing musical sounds and the like to accompany the projection of motion pictures comprising a picture-film having horizontal rows of transparent sound marks on sections thereof between the pictures, sound producing instruments, electro-magnetic operating means therefor, electric circuits including said electro-magnetic means, light operated means for closing and opening said circuits, said light operated means being adapted to be controlled by the rays of light through the sound marks.

10. Apparatus for synchronously producing musical sounds and the like to accompany the projection of motion pictures comprising a film having picture scenes and sound marks photographed thereon, means for simultaneously projecting the pictures and rays of light through the sound marks, means for reducing the magnified light rays from the sound marks, sound producing instruments, and light controlled means upon which the sound marks are projected for operating said sound producing instruments.

In testimony whereof I affix my signature.

ELMER LEWIS GREENSFELDER.